US008863543B2

(12) United States Patent
Heckenberger et al.

(10) Patent No.: US 8,863,543 B2
(45) Date of Patent: Oct. 21, 2014

(54) DEVICE FOR COOLING A HEAT SOURCE OF A MOTOR VEHICLE

(75) Inventors: Thomas Heckenberger, Leinfelden-Echterdinugen (DE); Stefan Hirsch, Stuttgart (DE); Heiko Neff, Affalterbach (DE); Tobias Isermeyer, Löwenstein (DE); Caroline Schmid, Stuttgart (DE); Jalal Mohamed-Ali, Böblingen (DE); Hans-Georg Herrmann, Stuttgart (DE); Achim Wiebelt, Deidesheim (DE)

(73) Assignee: Behr GmbH & Co. KG, Stuttgart (DE)

( * ) Notice: Subject to any disclaimer, the term of this patent is extended or adjusted under 35 U.S.C. 154(b) by 311 days.

(21) Appl. No.: 13/017,001

(22) Filed: Jan. 29, 2011

(65) Prior Publication Data
US 2011/0174004 A1    Jul. 21, 2011

Related U.S. Application Data

(63) Continuation of application No. PCT/EP2009/059809, filed on Jul. 29, 2009.

(30) Foreign Application Priority Data

Jul. 29, 2008  (DE) .......................... 10 2008 035 400
Sep. 23, 2008  (DE) .......................... 10 2008 048 577

(51) Int. Cl.
| F28F 7/02 | (2006.01) |
| F28F 3/12 | (2006.01) |
| B60H 1/00 | (2006.01) |
| H01M 10/625 | (2014.01) |
| H01M 10/6569 | (2014.01) |
| F28F 9/02 | (2006.01) |
| H01M 10/613 | (2014.01) |
| H01M 10/6554 | (2014.01) |
| H01M 10/617 | (2014.01) |
| H01M 10/6556 | (2014.01) |
| H01M 10/6568 | (2014.01) |
| H01M 10/663 | (2014.01) |
| H01M 10/0525 | (2010.01) |
| H01M 10/34 | (2006.01) |

(52) U.S. Cl.
CPC .............. *F28F 3/12* (2013.01); *H01M 10/0525* (2013.01); *Y02E 60/12* (2013.01); *H01M 10/345* (2013.01); *B60H 1/00278* (2013.01); *H01M 10/5016* (2013.01); *H01M 10/5079* (2013.01); *F28F 9/026* (2013.01); *H01M 10/5004* (2013.01); *H01M 10/5053* (2013.01); *H01M 10/5008* (2013.01); *H01M 10/5057* (2013.01); *H01M 10/5077* (2013.01); *H01M 10/5095* (2013.01)
USPC .......... 62/259.2; 165/101; 165/139; 165/170; 165/287

(58) Field of Classification Search
CPC ................................... B60H 1/00278
USPC ........... 62/199, 259.2; 165/168, 170, 52, 101, 165/139, 287
See application file for complete search history.

(56) References Cited

U.S. PATENT DOCUMENTS 4,502,297 A * 3/1985 Winterer .......................... 62/515
6,138,466 A * 10/2000 Lake et al. ........................ 62/199

(Continued)

FOREIGN PATENT DOCUMENTS

| DE | 44 08 960 C1 | 4/1995 |
| DE | 195 15 526 C1 | 5/1996 |
| DE | 100 65 205 A1 | 7/2002 |

(Continued)

*Primary Examiner* — Cheryl J Tyler
*Assistant Examiner* — Jonathan Bradford
(74) *Attorney, Agent, or Firm* — Muncy, Geissler, Olds & Lowe, P.C.

(57) ABSTRACT

A device for cooling a heat source of a motor vehicle is provided that includes a cooling body which has a plurality of feed flow channels and a plurality of return flow channels. At least a multiplicity of the feed flow channels and return flow channels are arranged adjacent to one another in an alternating fashion in the cooling body.

19 Claims, 13 Drawing Sheets

(56) References Cited

U.S. PATENT DOCUMENTS

| | | | |
|---|---|---|---|
| 6,382,310 B1 * | 5/2002 | Smith | 165/121 |
| 2002/0000311 A1 * | 1/2002 | Kurita | 165/169 |
| 2002/0153130 A1 * | 10/2002 | Okamoto et al. | 165/170 |
| 2004/0038099 A1 * | 2/2004 | Balan | 429/26 |
| 2004/0182560 A1 | 9/2004 | Kenny et al. | |
| 2005/0061497 A1 | 3/2005 | Amaral et al. | |
| 2008/0105402 A1 * | 5/2008 | Behrens et al. | 165/41 |
| 2008/0223056 A1 * | 9/2008 | Heinbokel et al. | 62/225 |

FOREIGN PATENT DOCUMENTS

| | | |
|---|---|---|
| DE | 103 12 780 A1 | 11/2004 |
| EP | 0 964 460 A1 | 12/1999 |
| EP | 1 391 955 A2 | 2/2004 |
| EP | 1 906 126 A2 | 4/2008 |
| WO | WO 03/031884 A2 | 4/2003 |

* cited by examiner

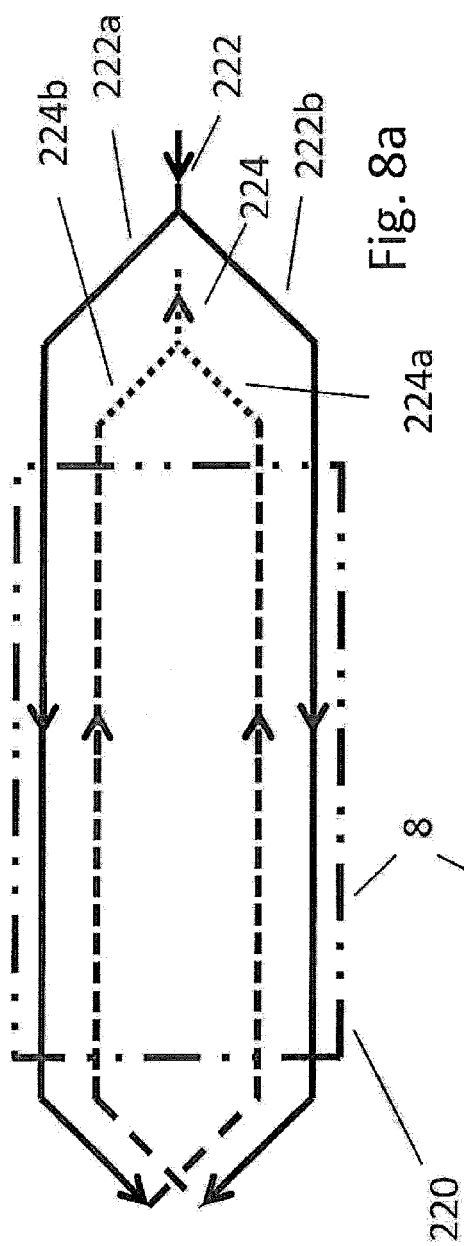
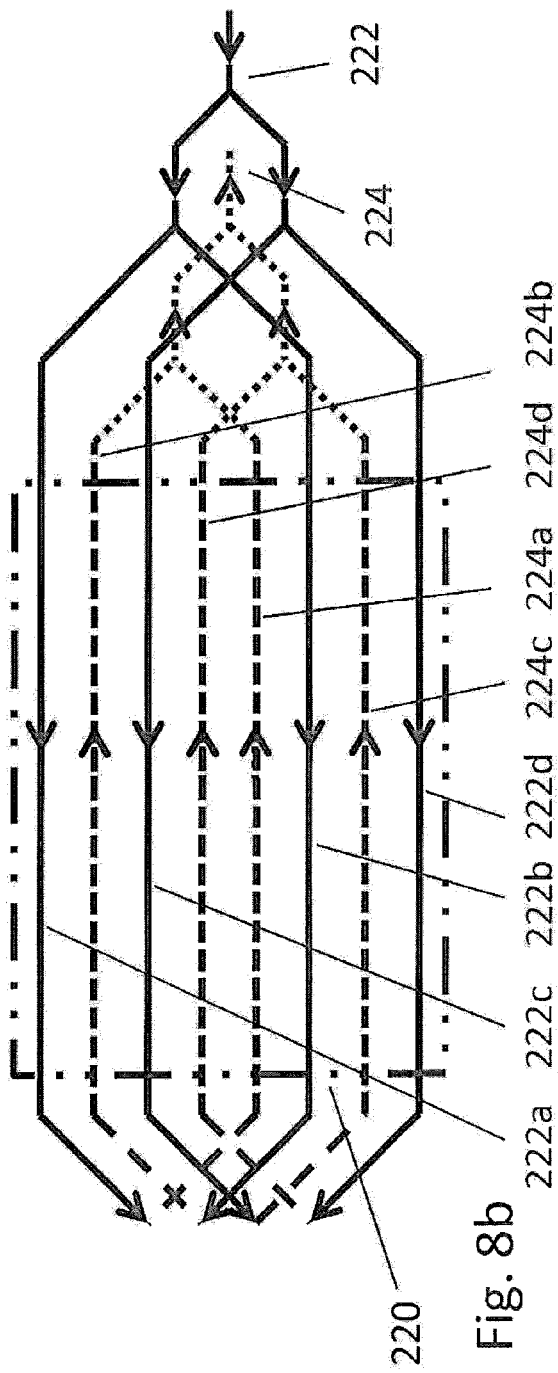
Fig. 8a
Fig. 8b

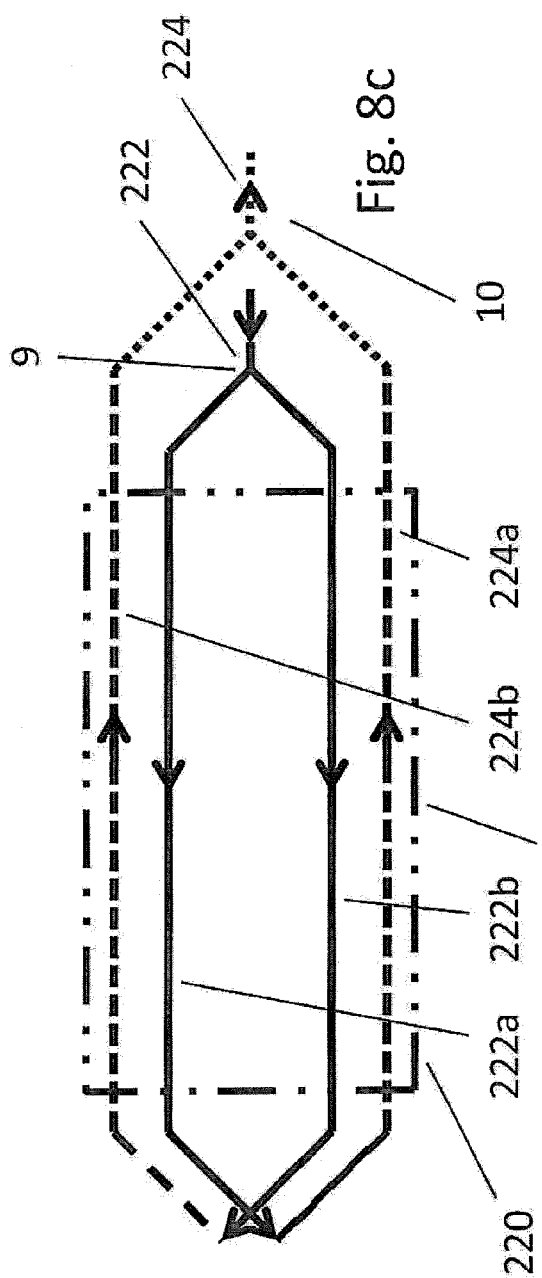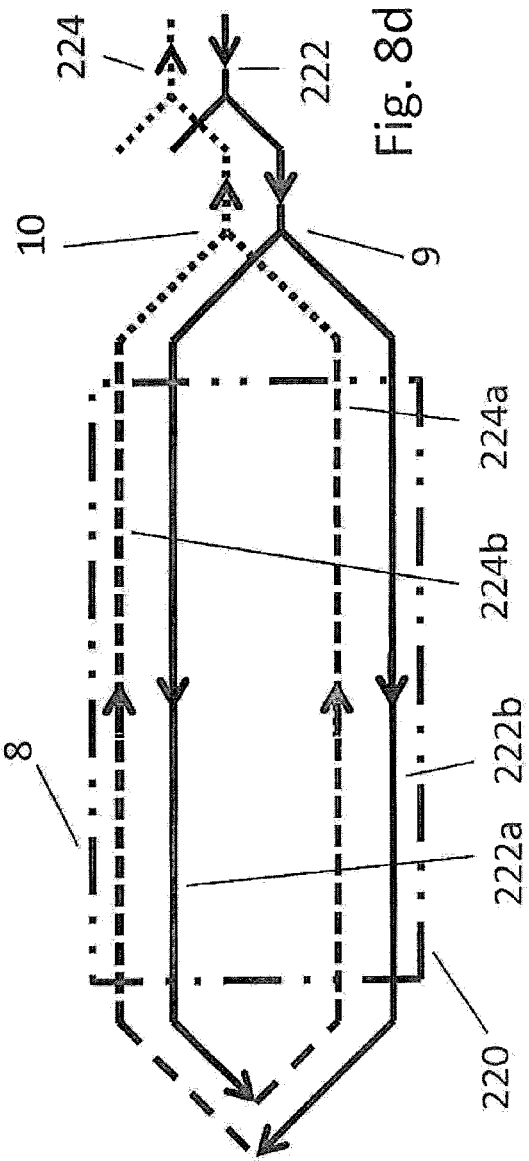

US 8,863,543 B2

DEVICE FOR COOLING A HEAT SOURCE OF A MOTOR VEHICLE

This nonprovisional application is a continuation of International Application No. PCT/EP2009/059809, which was filed on Jul. 29, 2009, and which claims priority to German Patent Application Nos. DE 10 2008 035 400.7 and DE 10 2008 048 577.2, which were filed in Germany on Jul. 29, 2008 and Sep. 23, 2008, respectively, and which are all herein incorporated by reference.

BACKGROUND OF THE INVENTION

1. Field of the Invention

The present invention relates to a device for cooling a heat source of a motor vehicle and to a refrigerant circulation system for a motor vehicle.

2. Description of the Background Art

Powerful energy accumulators such as lithium ion and NiHM batteries or "super caps" are used in modern hybrid electric vehicles or electric vehicles (HEV/EV vehicles). Resistances within and outside the cells cause these energy accumulators to heat up during rapid charging and discharging. Temperatures above 50° C. permanently damage the energy accumulators. To ensure the operation of the energy accumulators, the latter must be actively cooled. For this purpose, the energy accumulators are brought into contact with a plate through which refrigerant flows and are cooled thereby. The battery cooling plate is integrated into the existing air conditioning refrigeration circuit within the vehicle as an additional, second evaporator (dual evaporator system).

When cooling the cells, it is important for all cells to be cooled uniformly. As a result, a maximum temperature gradient of around 5K must be maintained in the cooling plate. If cell cooling is not uniform, the cells age at different rates, which has a negative impact on the operation and performance of the energy accumulator.

FIG. 4 shows a refrigerant circulation system according to the conventional art, in which a battery cooling plate 402 is series-connected to an air conditioner evaporator 404. In addition to battery cooling plate 402 and air conditioner evaporator 404, the refrigerant circulation system has a compressor 406, a condenser 408, a valve 412 having a fixed opening (FXV) and a thermal expansion valve (TXV) 414.

Cooling plate 402 for cooling the energy accumulator is always operated in "wet" mode to ensure uniform cooling of all energy accumulator cells. This means that battery cooling plate 402 must always be provided with enough refrigerant that the physical processes within battery cooling plate 402 always take place in the wet steam region. To ensure uniform temperature distribution on plate 402, overheating should never occur in plate 402.

Transferred to the refrigeration circuit in the vehicle, this means that it is not possible to introduce battery cooling plate 402 directly upstream from compressor 408 in a manner analogous to the interconnection of air conditioner evaporator 404. After all, refrigerant is still present in the outlet of plate 402, so that compressor 406 may be exposed to liquid impact, which would cause damage.

Battery cooling plate 402 is therefore series-connected to main air conditioner evaporator 404. The still present fluid portion of the refrigerant is re-evaporated in main air conditioner evaporator 404, thereby preventing liquid impact at compressor 406. The mass flow through battery cooling plate 404 is determined by valve 412 having a fixed opening. The fixed opening diameter of valve 412 is determined by the maximum load in the battery.

FIG. 5 shows a battery cooling plate 520 according to the conventional art. Battery cooling plate 520 has a plurality of refrigerant passages 526. Refrigerant passages 526 have a common inlet 532 and a common outlet 534.

The operating points for battery cooling plate 520 are set in the circuit in such a way that the operating point of plate 520 is always in the wet steam region, and the refrigerant in plate 520 thus has approximately the same temperature. In designing the flow passages in plate 520, it is necessary to ensure, in particular, that the refrigerant is distributed uniformly to passages 526, that the pressure loss in plate 520 is not excessive, and that sufficient passages 526 are provided for uniform cooling of plate 520. To ensure uniform distribution of the refrigerant, one option is to allow the refrigerant to enter at a point 532 on plate 520 so that the refrigerant may be distributed to individual passages 526 in plate 520. Passages 526 converge again at outlet point 534. Feed and return flows are situated at a relatively great spatial distance from each other.

The interconnection of the battery cooling plate shown in FIG. 4 in the vehicle refrigerant circuit has the disadvantage that the battery cooling system is always coupled with the air conditioning system of the vehicle compartment. It is not possible to operate the battery cooling plate alone without the air conditioner evaporator. This has enormous disadvantages, particularly in winter, since the air conditioner evaporator is operated only up to specific outdoor temperatures to prevent icing. Specifically, this means that the battery may no longer be operated at cold outdoor temperatures.

SUMMARY OF THE INVENTION

It is therefore an object of the present invention to provide an improved device for cooling a heat source of a motor vehicle and an improved refrigerant circulation system for a motor vehicle.

The present invention is based on the finding that a refrigerant plate may be operated directly upstream from a compressor if the refrigerant is gaseous at the outlet of the refrigerant plate. To uniformly distribute heat on the refrigerant plate, the refrigerant passages in the refrigerant plate are situated according to the invention in such a way that feed and return flows are positioned directly next to each other.

The battery cooling plate according to the invention may be advantageously interconnected within the refrigeration circuit in such a way that the battery cooling system may be operated even without an air conditioner evaporator. The battery cooling plate is thus designed for the challenges of uniform cell cooling resulting from the new interconnection.

The present invention provides a device for cooling a heat source of a motor vehicle, comprising a cooling body which has multiple feed flow passages and multiple return flow passages, at least a plurality of the feed flow passages and return flow passages being situated adjacent to each other in an alternating manner within the cooling body. The alternating arrangement of feed flow passages and return flow passages makes it possible to distribute temperature as uniformly as possible within the cooling body. A predetermined maximum temperature gradient on the cooling body may thus be maintained.

For example, the feed flow passages and the return flow passages may be situated within the cooling body in such a way that at least one return flow passage is situated between adjacent feed flow passages. The feed flow passages and the return flow passages may also be situated within the cooling body in such a way that at least one feed flow passage is situated between adjacent return flow passages. This makes it possible to ensure that a temperature difference between feed flow passages and return flow passages is compensated.

The cooling body may have an inlet opening which is connected to the feed flow passages and which has one or a plurality of outlet openings, each of which is connected to one of the return flow passages. This makes it possible to prevent feed flow passages or return flow passages from intersecting.

The cooling body may have a plurality of connecting points, each of which is designed to connect one of the feed flow passages to one of the return flow passages. The plurality of connecting points may be situated in a first half of the cooling body, and the inlet opening and the one or a plurality of the outlet openings may be situated in a second side of the cooling body, the first and the second halves being situated opposite each other. The feed flow passages and the return flow passages may thus be run next to each other over as great a distance as possible.

According to an embodiment, the cooling body includes multiple layered plates, passages being formed between the plates and a fluid being conductible through the passages from an inlet opening to an outlet opening. By stacking the plates, it is possible to situate the passages on different planes. The passages may intersect on the different planes and converge at an outlet point and at an outlet opening. This makes it possible to dispense with complex connecting blocks.

The device may be advantageously designed to accept a fluid, in particular a refrigerant, in at least partially liquid form, and to discharge the fluid, in particular a refrigerant, in a gaseous form. A compressor may thus be connected downstream from the device without running the risk of the compressor being damaged by liquid impact. For this purpose, the return flow passages may each have an overheating zone in the region of the outlet openings.

The device according to an embodiment of the invention may have a connecting block which has a supply opening and a discharge opening and is designed to connect the inlet opening of the cooling body to the supply opening as well as to connect the one or plurality of outlet openings of the cooling body to the discharge opening. The connecting block enables coordinated connection of the cooling body to a refrigerant circuit. In particular, the terminal block may be designed to distribute the fluid, in particular the refrigerant, uniformly to the multiple feed flow passages.

The present invention furthermore can provide a refrigerant circulation system for a motor vehicle, comprising a device according to the invention for cooling a heat source of a motor vehicle and a compressor which is connected downstream from the cooling device. The refrigerant circulation system may advantageously be operating even without an additional air conditioner evaporator.

According to an embodiment, the refrigerant circulation system can have an air conditioner evaporator which is parallel-connected to the cooling device. The parallel connection makes it possible to operate the cooling device and the air conditioner evaporator independently of each other.

According to another embodiment, the refrigerant circulating system may have a regulated expansion valve for regulating a refrigerant flow through the cooling body. For example, a thermal expansion valve may be used. The regulated expansion valve may be designed to regulate the refrigerant flow as a function of a temperature of the fluid, in particular the refrigerant, after flowing through the cooling body. This makes it possible to ensure that the fluid, in particular the refrigerant, is gaseous at the outlet. The regulation also enables clocked cooling of the heat source.

According to a further embodiment, the expansion valve may form a structural unit with the cooling body. This makes it possible to reduce the number of parts in the refrigerant circulation system and facilitate assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 8a-8e show different representations of the cooling device according to the invention.

DETAILED DESCRIPTION

Figure 1:
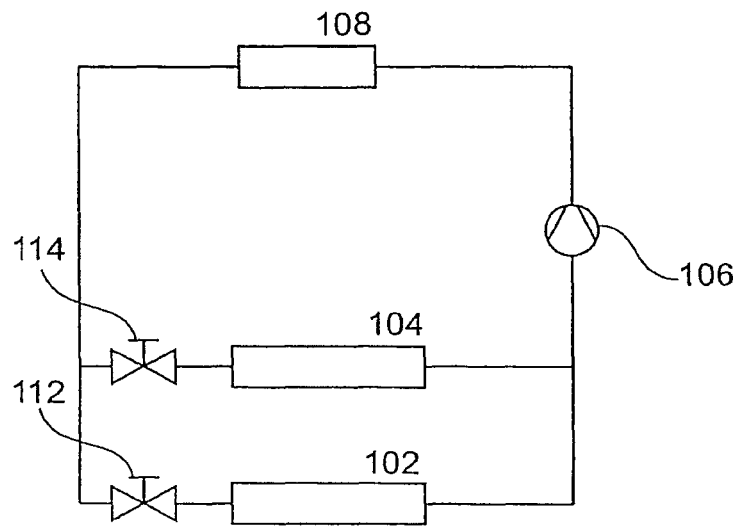
FIG. 1 shows a representation of a refrigerant circuit according to the invention.

In the following description of the preferred exemplary embodiments of the present invention, identical or similar reference numerals are used for the elements illustrated in the different drawings and having a similar function, these elements not being described repeatedly.

FIG. 1 shows a refrigerant circulation system according to an exemplary embodiment of the present invention. The refrigerant circulation system may be used for cooling a heat source, for example in a motor vehicle. The heat source may be a powerful energy accumulator, for example lithium ion batteries or NiMH batteries or super caps. The refrigerant circulation system has a device for cooling the heat source which is designed as battery cooling plate 102 according to this exemplary embodiment. Battery cooling plate 102 is parallel-connected to an air conditioner evaporator 104. In addition to battery cooling plate 102 and air conditioner evaporator 104, the refrigerant circulation system also has a compressor 106, a condenser 108, a first regulated expansion valve (TXV) 112 and a second regulated expansion valve (TXV) 114.

A refrigerant may flow throw the refrigerant circulation system. First expansion valve 112 is situated upstream from battery cooling plate 102 in the direction of flow and designed to regulate a flow of the refrigerant through battery cooling plate 102. For example, expansion valve 112 may be designed to regulate the flow of the refrigerant as a function of a temperature of the refrigerant on the output side of battery cooling plate 102. For this purpose, the temperature of the refrigerant may be detected by a temperature sensor and provided to a controller of expansion valve 112. Second expansion valve 114 is situated upstream from air conditioner evaporator 104 in the direction of flow and designed to regulate a flow of the refrigerant through air conditioner evaporator 104. Compressor 106 is situated downstream from battery cooling plate 102 and air conditioner evaporator 104 in the flow path of the refrigerant. Compressor 106 is connected to condenser 108 on the output side. Condenser 108 is connected on the output side to battery cooling plate 102 and air conditioner evaporator 104 via valves 112, 114.

Air conditioner evaporator 104 is not required for operating the cooling circuit. To ensure autonomous operation of battery cooling system 102, battery cooling system 102 should no longer be coupled to the operation of air conditioner evaporator 104. For this purpose, battery cooling plate 102 is parallel-connected to air conditioner evaporator 104, as shown in FIG. 1. The mass flow through battery cooling plate 102 is now no longer regulated by a valve having a fixed opening (FXV), but by an expansion valve 112 which regulates the mass flow through battery cooling plate 102 after overheating downstream from battery cooling plate 102. This type of regulation may be similar to the regulation of air conditioner evaporator 104.

Figure 5:
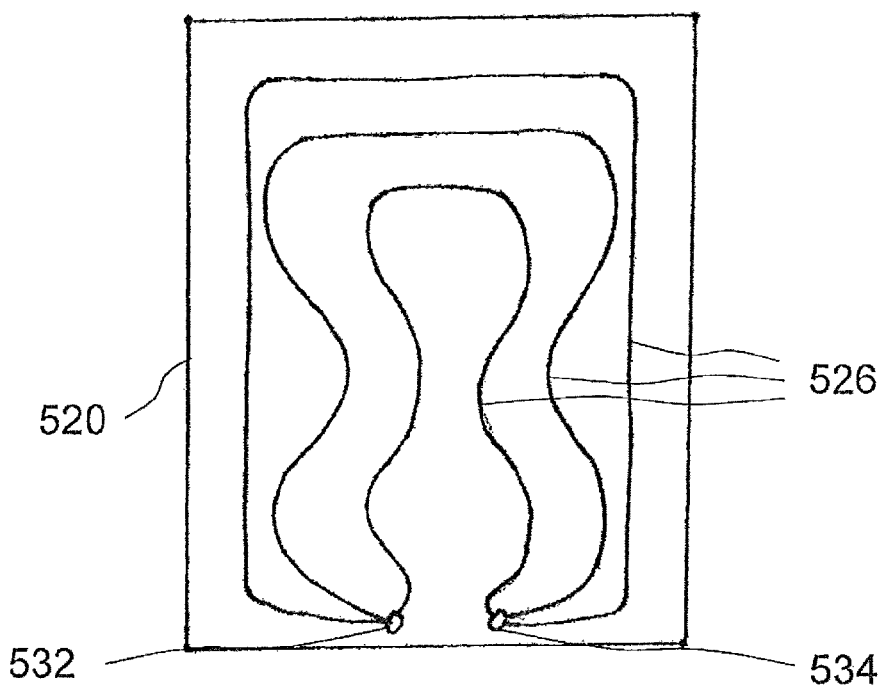
FIG. 5 shows a representation of a cooling plate according to the conventional art.

In the interconnection according to the present invention, locally defined overheating zones (overheated steam) occur in the outlet region of the passages in battery cooling plate 102 (physical effect). The overheating usually lies in the range from 1K to 10K. On plate 102, the temperature gradient in the refrigerant has a direct effect on the plate temperature, due to the overheating zone, since battery cooling plate 102 is usually made of a highly heat-conductive material, for example aluminum. This means that "cold" and "hot" zones exist on the plate surface. In the design of battery cooling plates 102 according to the conventional art, as shown in FIG. 5, the required temperature gradient of 5K on the plate may no longer be maintained. Plate 520 illustrated in FIG. 5 has three passages 526 and inlet and outlet regions 532, 534. The feed and return flows are not situated directly adjacent to each other, so that it is not possible for a temperature compensation to take place to the necessary extent on plate 520.

Therefore, in the interconnection of battery cooling plate 102 within the refrigerant circulation system, according to the invention and as illustrated in FIG. 1, the design of cooling plate 102 or the passage run is adapted to the overheating zones in such a way that a uniform temperature distribution on plate 102, and thus a uniform cooling of the cells, may be ensured despite overheating in plate 102.

Figure 2:
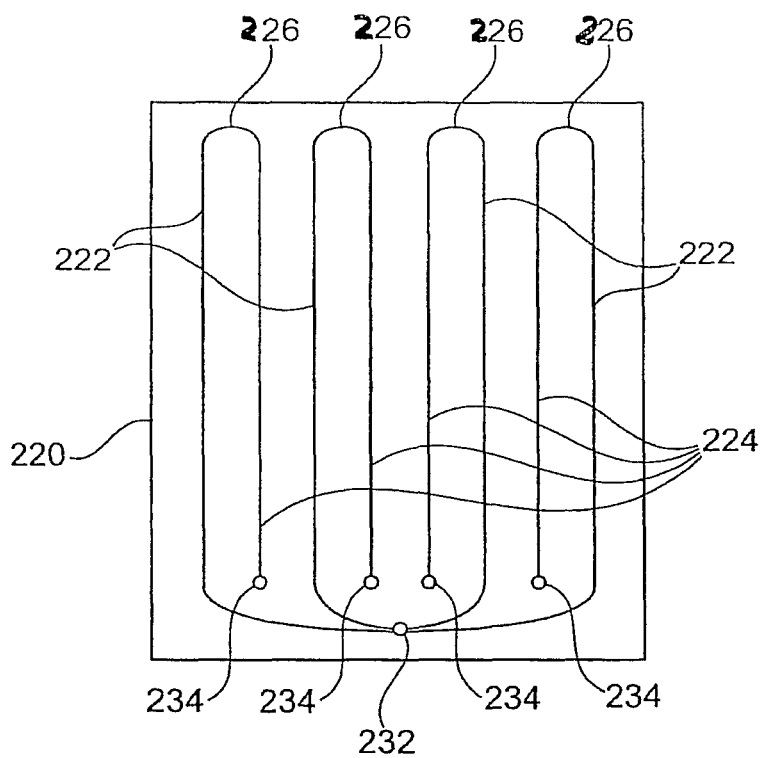
FIG. 2 shows a representation of the cooling device according to the invention.

FIG. 2 shows a representation of a device for cooling a heat source according to an exemplary embodiment of the present invention. According to this exemplary embodiment, the cooling device is designed as a battery cooling plate for overheating regulation. The battery cooling plate has a cooling body 220, in which multiple feed flow passages 222 and multiple return flow passages 224 are situated. Feed flow passages 222 and return flow passages 224 may be designed as channels within cooling body 220 through which a refrigerant suitable for cooling may flow. Feed flow passages 222 are each connected to an assigned return flow passage 224 via connecting points 226. Cooling body 220 has an inlet opening 232 and a plurality of outlet openings 234. The refrigerant may flow into cooling body 220 via inlet opening 232 and out of cooling body 220 via the plurality of outlet openings 234. In particular, the refrigerant may flow into feed flow passages 222 via inlet opening 232, into return flow passages 224 via connecting points 226 and out of return flow passages 224 via outlet openings 234. According to this exemplary embodiment, connecting points 226 are situated on an edge of cooling body 220, and inlet and outlet openings 232, 234 are situated on an opposite edge of cooling body 220. Feed flow passages 222 and return flow passages 224 are run parallel to each other within cooling body 220. Feed flow passages 222 and return flow passages 224 are each situated in an alternating manner, so that one return passage 224 is situated next to each feed flow passage 222 and vice versa. According to this exemplary embodiment, two return flow passages 224 are situated adjacent to each other in the middle region of cooling body 220.

The temperature level of the refrigerant in passages 222, 224 of battery cooling plate 220 upstream from the overheating zone is nearly constant, due to refrigerant evaporation, and is always lower than the temperature level in the overheating zone. The shifting of the steam pressure in the refrigerant, due to the pressure loss in passages 222, 224, is negligible in the case of an optimum passage design. To implement a uniform distribution of temperature on the plate surface, it is therefore necessary to situate passages 222, 224 having "cold" evaporation zones directly adjacent to "hot" overheating zones, i.e. feed flow and return flow. The temperature gradients within plate 220 are compensated, and the temperature equalizes on the plate surface. FIG. 2 shows a possible passage design. In this case feed flow passages and return flow passages 222, 224 are situated directly adjacent to each other.

Figure 3A:
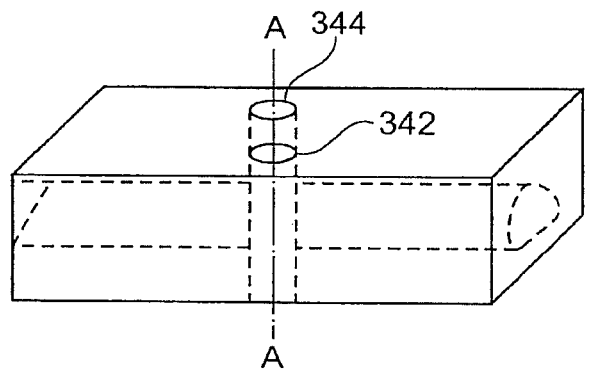
FIGS. 3a-3c show representations of a connecting block for the cooling device according to the invention.
Figure 3B:
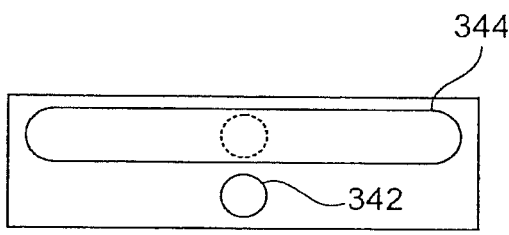
Figure 3C:
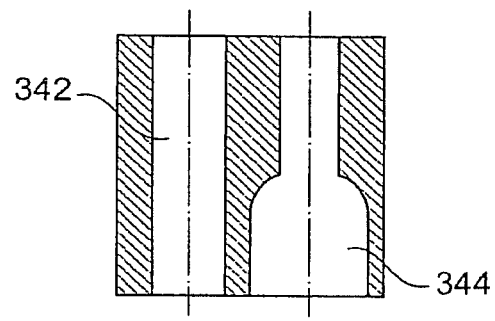
Figure 4:
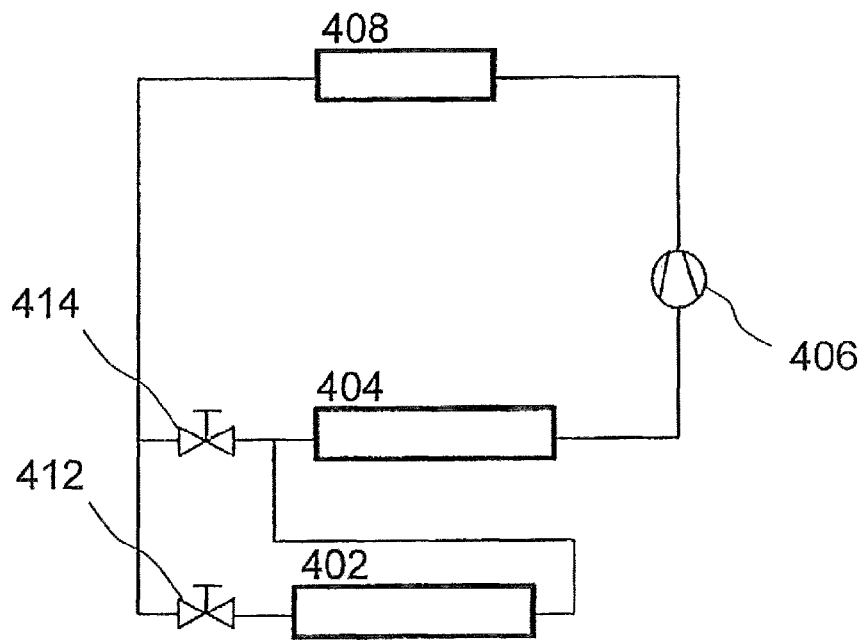
FIG. 4 shows a representation of a refrigerant circuit according to the conventional art.

Such a design of the flow passages in plate 220 goes hand in hand with a complex connecting block (illustrated in FIGS. 3a through 3c). Entry into plate 220 takes place at a point 232 according to the exemplary embodiment illustrated in FIG. 2.

If possible, point 232 should be situated symmetrically to passage run 222 to ensure an optimum, uniform distribution of the two-phase refrigerant (steam and liquid) to individual passages 222 in plate 220 at the inlet of plate 220. If a symmetrical arrangement is not possible for reasons of installation space, the cross section of passages 222, 224 in plate 220 must be adjusted accordingly. A uniform distribution of the refrigerant is very important for uniform, homogeneous temperature distribution. If the refrigerant is not distributed uniformly, this may result in unwanted, undefined overheating zones.

The refrigerant discharge may no longer be combined at a single point in this plate design without passages 224 intersecting. Plate 220 therefore has multiple refrigerant outlet points 224 which only converge again in the connecting block.

A further advantage of the passage arrangement according to the invention is derived when plate 220 is not cooled continuously, but rather cooling is carried out in ON/OFF mode (clocking). According to the clocking principle, the battery is not cooled until the cells have reached a specific critical temperature. Once the cells have reached the critical temperature, cooling is activated, and the cells are cooled until a minimum temperature has been reached; as a rule, the optimum temperature range for the cell is between 30° C. and 40° C. The clocked injection of the refrigerant makes it possible to always maintain the cells within this optimum temperature range.

If refrigerant is injected into "heated" plate 220, the refrigerant first begins to vaporize and overheat in the inlet region. The overheating front continues to move in the direction of plate outlet 234 until a steady state is reached. The temperature gradient in the refrigerant is often greater than 10K until the steady state is reached. The flow conduction in plate 220 having feed and return passages 222, 224 directly adjacent to each other makes it possible to compensate and reduce these high temperature gradients. Autonomous operation of the battery cooling system is thus possible, and the passage design equalizes temperature gradients from overheating regulation and/or clocked injection of the refrigerant in the plate surface. The battery cooling plate according to the invention is suitable for overheating regulation and clocking.

FIGS. 3a through 3c show different representations of a connecting block according to an exemplary embodiment of the present invention. The connecting block is suitable for connecting the cooling body illustrated in FIG. 2 to the coolant circulation system illustrated in FIG. 1. In particular, the connecting block is designed to distribute the inflowing refrigerant uniformly to the multiple feed flow passages in the cooling body.

FIG. 3a shows a view of the connecting block, which has supply opening 342 and a discharge opening 344. According to this exemplary embodiment, the connecting block has a cuboid design, and supply opening 342 and discharge opening 344 are situated adjacent to each other on a surface of the connecting block. Supply opening 342 forms an inlet and discharge opening 344 forms an outlet for the refrigerant flowing through the cooling body. For this purpose, the connecting block has channels which are designed to connect supply opening 342 to the inlet opening of the cooling body and discharge opening 344 to the outlet openings of the cooling body. According to this exemplary embodiment, channels lead from supply opening 342 and discharge opening 344 to the connecting block in a perpendicular manner. The channel connected to discharge opening 344 is connected to a further horizontal channel within the connecting block to establish a connection to the plurality of outlet openings in the cooling body.

FIG. 3b shows a top view of the connecting block illustrated in FIG. 3a.

FIG. 3c shows a cross section of the connecting block along section line A-A illustrated in FIG. 3a. Discharge opening 344 has an extension of the diameter in a region facing the cooling body.

The cooling device according to the invention may be used for cooling heat sources other than the ones described. The shape of the cooling body may be adapted to the heat sources. In particular, a surface of the cooling body may be designed according to a surface of the heat source to be contacted. The passage arrangement may be adjusted depending on the shape of the cooling body. An alternating arrangement of feed flow passages and return flow passages is preferably maintained. The passages may be combined into individual groups. A deviation from the alternating arrangement may be provided, in particular in the transition region between two groups, so that in individual situations two feed flow passages or two return flow passages may be situated adjacent to each other. Depending on the conditions, an alternating arrangement of, for example, two feed flow passages and two return flow passages is possible. Such variations in the alternating arrangement are possible according to the invention, provided that the selected alternating arrangement permits compensation of the temperature difference between evaporation zones and overheating zones. The inlet and outlet openings may be situated at different points in the cooling body and their number may be varied. Thus, more than one inlet opening may be provided, or individual return flow passages may have a common outlet opening.

FIGS. 6a through 6f show a further exemplary embodiment of a device according to the invention for cooling a heat source of a motor vehicle. According to FIG. 6a, cooling body 220 includes multiple plates, namely a cover plate 601, a channel plate 602, an intermediate plate 603, a passage plate 604 and a base plate 605, which are layered on top of each other are preferably brazed, thus forming cooling body 220.

The plates, which will be described in greater detail below, have different recesses, so that a fluid may be conducted from an inlet opening 232 to an outlet opening 234, each of which is situated in cover plate 601. The recesses are preferably produced by stamping or lasers.

Figure 6A:
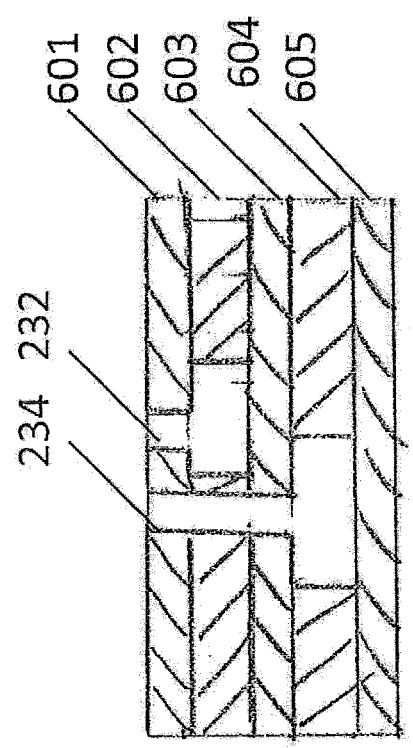
FIGS. 6a-6f show a representation of the cooling device according to the invention.
Figure 6B:
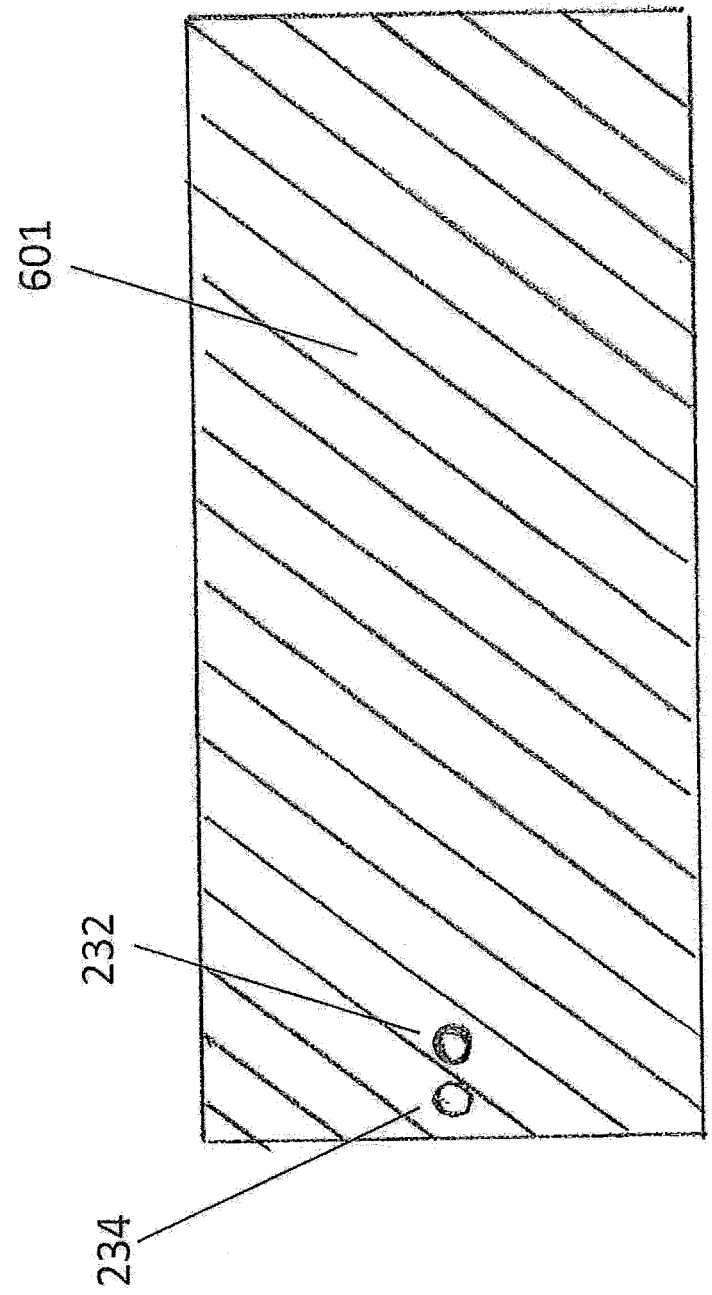
Figure 6C:
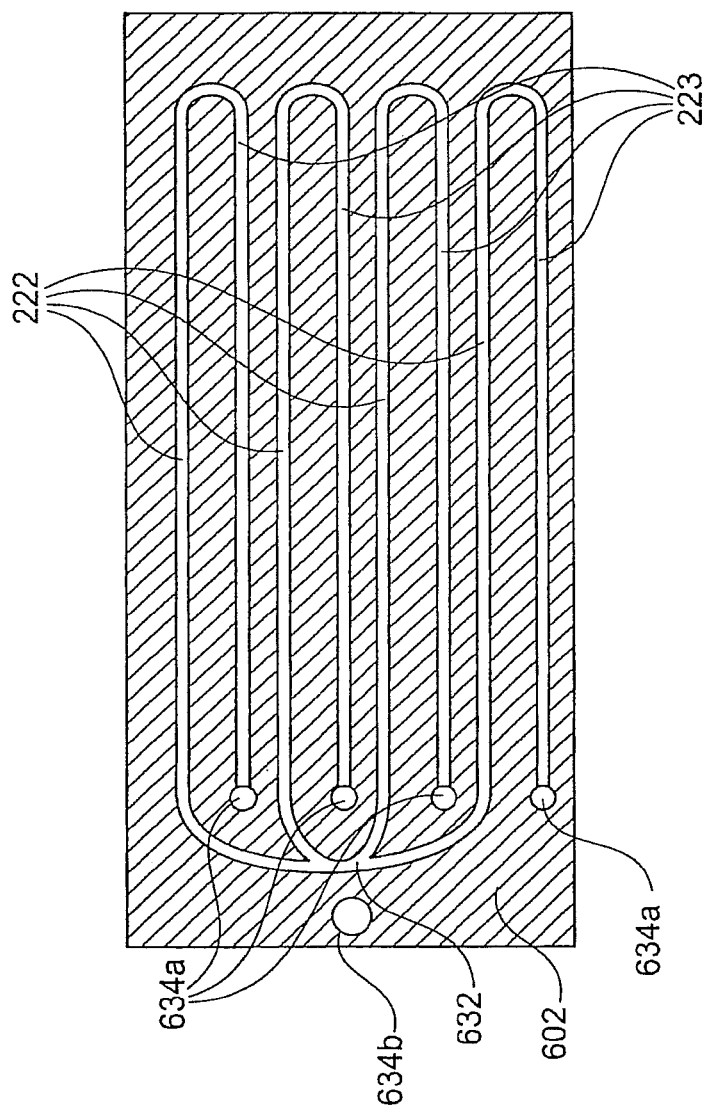
Figure 6D:
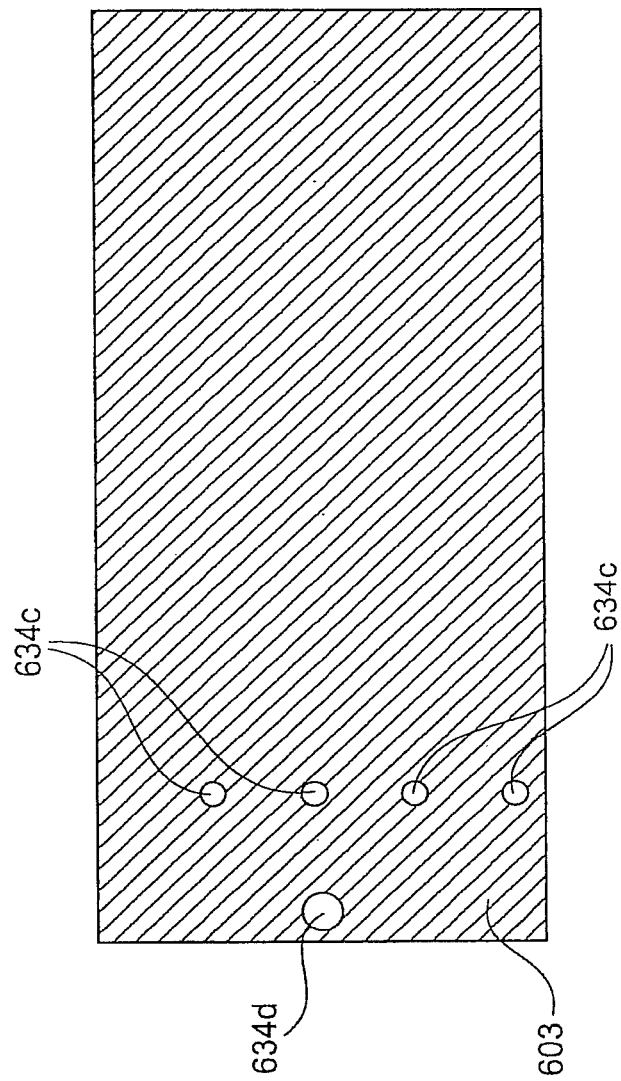
Figure 6E:
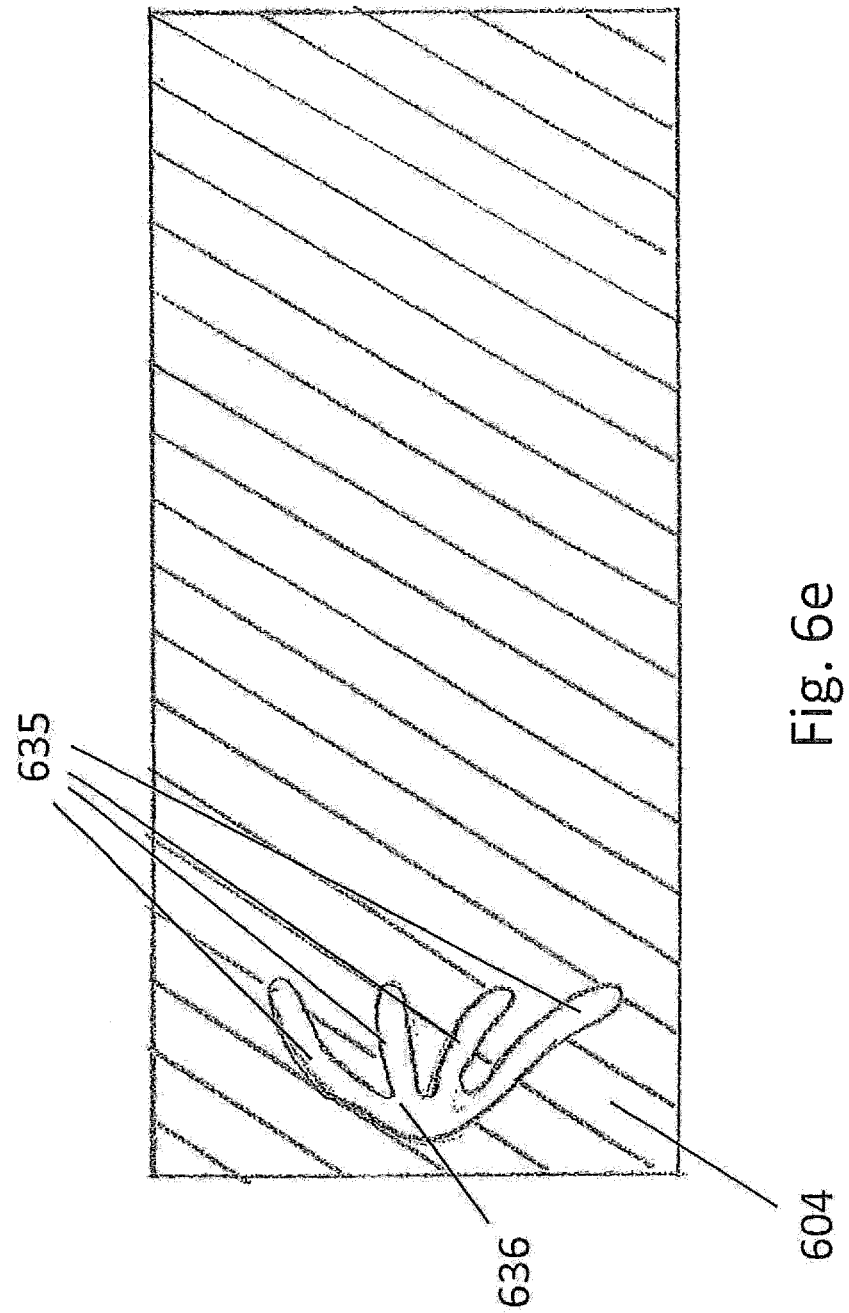
Figure 6F:
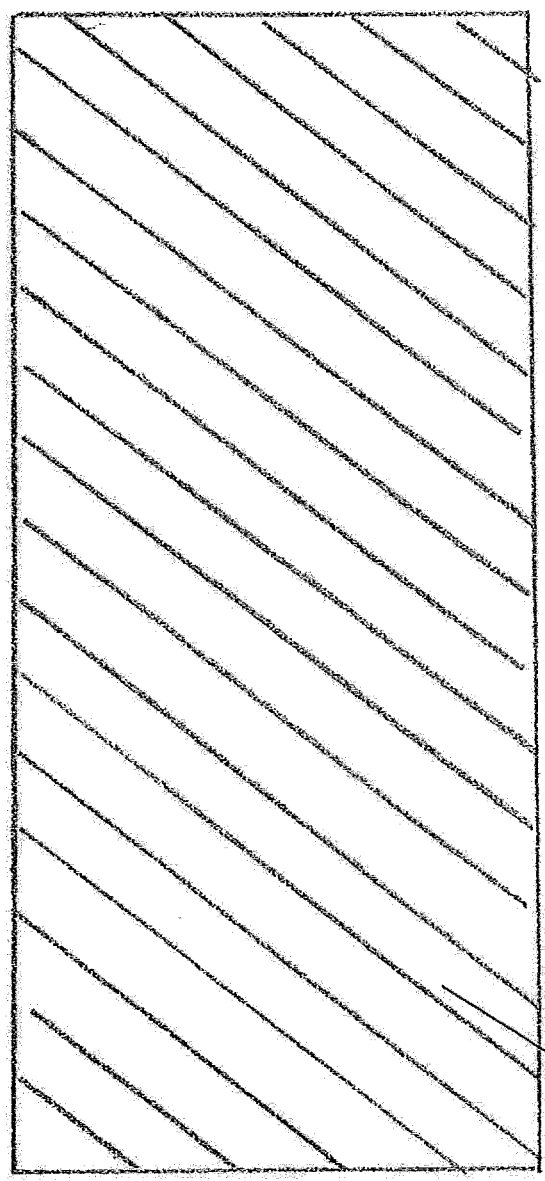

To obtain a cooling body 220 having passages from the individual plates, the plates are assembled in the following order:

Channel plate 602 (FIG. 6c) is placed on cover plate 601 (FIG. 6b). The channel plate has recesses 222 and 223, which form the feed and return flow passages, similar to the exemplary embodiment according to FIG. 2. The passage height thus corresponds to the thickness of channel plate 602. In addition, the channel plate has further openings 632 and 634a to establish a fluid connection to cover plate 601 and intermediate plate 603, respectively. The function of opening 634b will be discussed in greater detail below. Intermediate plate 603 (FIG. 6d) is then stacked onto open channel plate 602. The open passages in the channel plate are covered by intermediate plate 603. The intermediate plate furthermore has four openings 634c and one opening 634d, which ensure a fluid connection to channel plate 602 and passage plate 604, respectively. The outlets of passages 634a in the channel plate are combined by passages 635 into a single point 636 in passage plate 604 (FIG. 6e). To close passages 635 in passage plate 604, a further base plate 605 (FIG. 6f) is stacked onto the passage plate. The base plate preferably has the same size as all other plates; however, it may be designed to be smaller for the purpose of saving material. However, passages 635 must necessarily be covered by the passage plate.

A fluid therefore flows into channel plate 602 through inlet opening 232 in cover plate 601. The fluid is then conducted to openings 634a through passages 222 and 224 and to passage plate 604 through openings 634c in intermediate plate 603. There, the fluid in passages 635 is then deflected to a common outlet point 636. The fluid is conducted out of cooling body 220 through openings 634d, 634b and 234.

All plates are preferably made of a highly heat-conductive material, in particular aluminum.

An approach according to the invention combines three advantages. On the one hand, the plates may be manufactured very cost-effectively. Expensive manufacturing of plates having milled passages may be dispensed with.

Figure 7B:
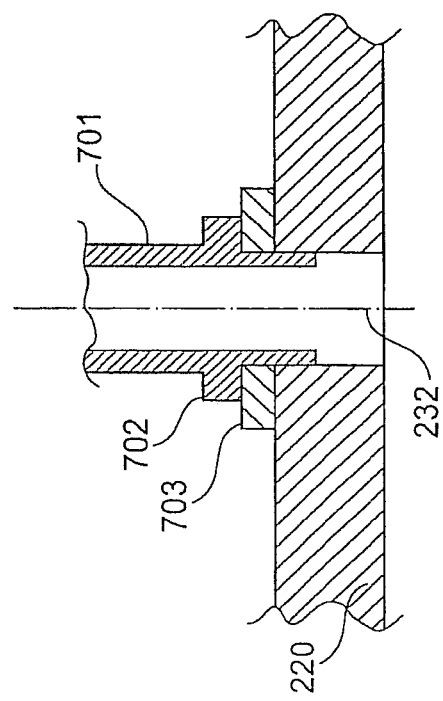
FIG. 7b shows a representation of a connection of a connecting tube to a cooling device according to the invention.
Figure 7A:
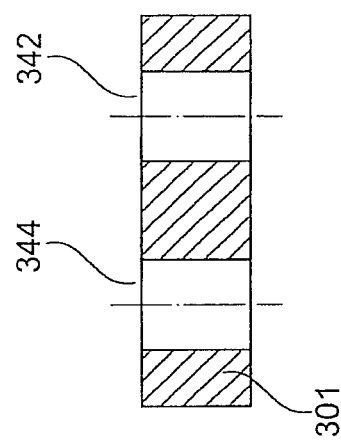
FIG. 7a show a representation of a connecting block for the cooling device according to the invention.
Figure 8E:
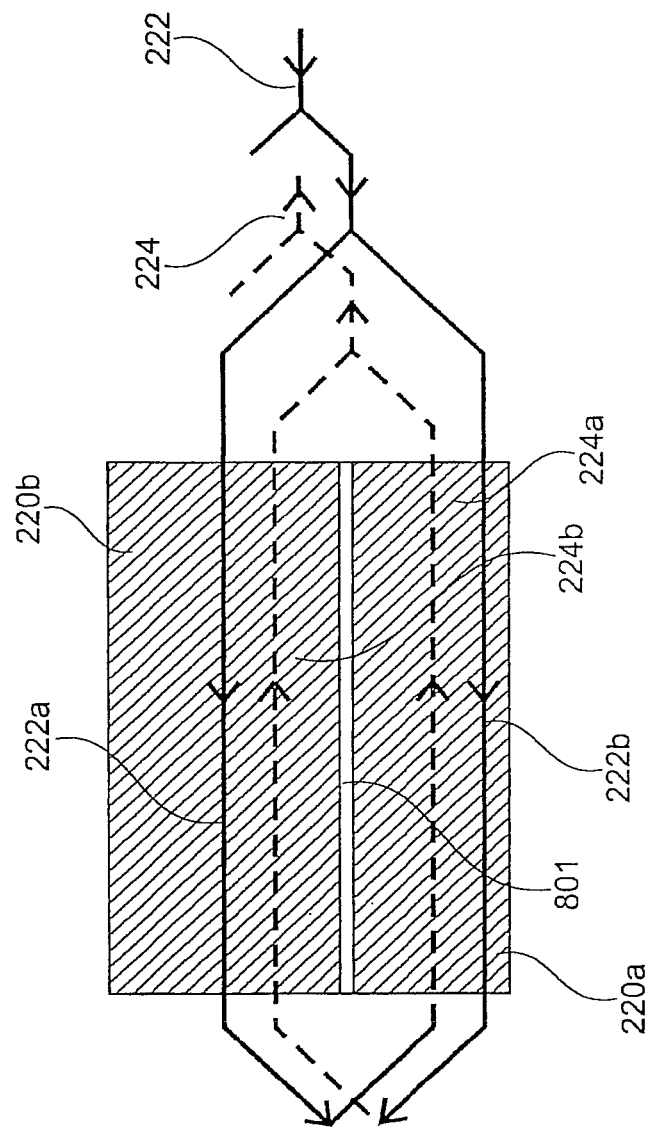

Designing the passages on different planes, on the one hand, makes it possible for the passages to intersect and, on the other hand, connecting block 301 may be provided with a very simple design due to the convergence of the passages at an outlet point and thus at an outlet opening 234 (see FIG. 7a).

Since the inlet and outlet in the cooling body each takes place at one point, it is no longer absolutely necessary to attach a connecting block to the cooling body for the connecting tubes. The tubes may also be brazed directly to cooling body 220 during the brazing process.

FIG. 7b shows a connection situation for a connecting tube 701 on a cooling body 220. The tube has a seam 702 at one end to ensure positioning of the tube and to prevent excessive penetration into cooling body 220. To achieve a brazed joint between the tube and cooling body, a brazing ring or brazing sheet 703 is inserted between the tube and the cooling body.

In a further exemplary embodiment, the channel plate may include multiple plates having webs in the channels which are used to stabilize the structure. The channel height then corresponds to the overall height of the individual plates.

FIGS. 8a through 8e show further exemplary embodiments of a device according to the invention for cooling a heat source of a motor vehicle. In particular, a section 8 of a cooling body 220 is illustrated, in which a particularly homogeneous refrigerant distribution and temperature distribution associated therewith are achieved on the surface of the cooling body.

According to FIG. 8*a*, a feed flow passage 222 is distributed to a first partial passage 222*a* and a second partial passage 222*b*. A refrigerant flowing in the feed flow passage is thus uniformly distributed to the two partial passages. Possible inlet and outlet openings are not illustrated in FIG. 8*a*.

The two partial passages are then conducted in a U-shaped flow pattern in such a way that a first partial passage 222*a* of the feed flow passage has a corresponding first partial passage 224*a* of a return flow passage, and a second partial passage 222*b* of the feed flow passage has a corresponding second partial passage 224*b* of the return flow passage. A refrigerant therefore flows starting from a feed flow passage 222 to a first partial passage 222*a* and subsequently, in a counter-flow, to a first partial passage 224*a* of the return flow passage. The first partial passage of the feed flow passage and the first partial passage of the return flow passage are preferably designed to be of equal length.

It is furthermore apparent from FIG. 8*a* that first partial passage 222*a* of the feed flow passage is situated directly adjacent to second partial passage 224*b* of the return flow passage, and second partial passage 222*b* of the feed flow passage is situated directly adjacent to first partial passage 224*a*. According to the invention, "directly adjacent" is understood to mean that no further passage exists between these two passages, so that a correspondingly highly heat-conductive connection exists between the two passages.

Such an arrangement of feed flow passages and return flow passages in the cooling body has, in principle, two distinct advantages. First, a uniform temperature distribution within the cooling body is achieved over the entire length of the partial passage, due to the compensation of temperature differences at the inlet and at the outlet of a refrigerant flow; secondly, inhomogeneous refrigerant flows are automatically equalized in the individual partial passages. For example, if the pressure loss rises in the first partial passage of the feed flow passage, thus reducing the refrigerant mass flow, the refrigerant mass flow is correspondingly increased in the second partial passage of the feed flow passage and the corresponding return flow passage. Since the first partial passage of the feed flow passage and the second partial passage of the return flow passage are located directly adjacent to each other, the smaller capacity of the first partial passage may be largely compensated by the added capacity of the second partial passage by means of heat conduction or by direct heat transfer between the two passages.

This principle of passage separation and the distribution of refrigerant flows associated therewith may be enhanced in any manner. For example, FIG. 8*b* shows a distribution of feed flow passage 222 to four partial passages 222*a* through 222*d* and this corresponding partial passages 224*a* through 224*d* of the return flow passage. Depending on the size of the cooling body, however, additional distributions to 8, 16, 32, 64 or more passages are also conceivable in the manner of a cascade circuit.

Depending on the application, as shown in FIGS. 8*a* through 8*d*, branch point 9 of the feed flow passage may be situated outside, inside or next to branch point 10 of the return flow passage. Alternatively, in a further exemplary embodiment according to FIG. 8*e*, cooling body 220 may comprise a first cooling body unit 220*a* and a second cooling body unit 220*b*, a greater number of cooling body units forming the cooling body also being possible.

The exemplary embodiments according to FIGS. 8*a* through 8*d* are suitable not only for use of a refrigerant, but also for a coolant, for example a mixture of water and glycol.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for cooling a heat source of a motor vehicle, the device comprising:
a cooling body having a plurality of feed flow passages and a plurality of return flow passages, at least a plurality of the feed flow passages and return flow passages being arranged adjacent to each other in an alternating manner within the cooling body,
wherein the cooling body has an inlet opening, which is connectable to the plurality of feed flow passages,
wherein the cooling body has a plurality of outlet openings, each respective outlet opening being connected with only one respective return flow passage,
wherein a feed flow passage is divided into a first partial passage and at least one second partial passage and a return flow passage is divided into a first partial return flow passage and a second partial return flow passage, and wherein the first partial passage of the feed flow passage is arranged directly adjacent to the second partial return flow passage corresponding to the second partial passage of the feed flow passage, and
wherein the second partial passage of the feed flow passage is arranged directly adjacent to the first partial return flow passage corresponding to the first partial passage of the feed flow passage.

2. The device according to claim 1, wherein the feed flow passages and the return flow passages are arranged within the cooling body such that at least one return flow passage is situated between adjacent feed flow passages.

3. The device according to claim 1, wherein the feed flow passages and the return flow passages are arranged within the cooling body in such a way that at least one feed flow passage is situated between adjacent return flow passages.

4. The device according to claim 1, wherein the cooling body includes multiple layered plates, and wherein the passages are formed between the plates and a fluid is conductible through the passages from an inlet opening to an outlet opening.

5. The device according to claim 1, wherein the cooling body has a plurality of connecting points, each of which is adapted to connect one of the feed flow passages to one of the return flow passages.

6. The device according to claim 5, wherein the plurality of connecting points are arranged in a first half of the cooling body, and wherein the inlet opening and the plurality of outlet openings are arranged in a second half of the cooling body, the first and second halves being located opposite each other.

7. The device according to claim 1, wherein the device is configured to accept a fluid, the fluid being a refrigerant, in at least partially liquid form and to discharge the fluid in gaseous form.

8. The device according to claim 1, wherein the return flow passages each have an overheating zone in a region of the outlet openings.

9. The device according to claim 1, having a terminal block which has a supply opening and a discharge opening and is configured to connect the inlet opening of the cooling body to the supply opening and to connect one or a plurality of the outlet openings of the cooling body to the discharge opening.

10. The device according to claim 1, wherein two of the plurality of return flow passages are positioned adjacent to each other in a middle region of the cooling body without a feed flow passage positioned between said two of the plurality of return flow passages.

11. The device according to claim 1, wherein a total number of outlet openings is equal to a total number of feed flow passages directly connected to the inlet opening.

12. A refrigerant circulation system for a vehicle, the system comprising:
- a device for cooling; and
- a compressor that is connected downstream from the cooling device,
- wherein the device for cooling comprises:
  - a cooling body having a plurality of feed flow passages and a plurality of return flow passages, at least a plurality of the feed flow passages and return flow passages being arranged adjacent to each other in an alternating manner within the cooling body,
  - wherein the cooling body has an inlet opening, which is connectable to the plurality of feed flow passages,
  - wherein the cooling body has a plurality of outlet openings, each respective outlet opening being connected with only one respective return flow passage,
  - wherein a feed flow passage is divided into a first partial passage and at least one second partial passage and a return flow passage is divided into a first partial return flow passage and a second partial return flow passage, and wherein the first partial passage of the feed flow passage is arranged directly adjacent to the second partial return flow passage corresponding to the second partial passage of the feed flow passage, and
  - wherein the second partial passage of the feed flow passage is arranged directly adjacent to the first partial return flow passage corresponding to the first partial passage of the feed flow passage.

13. The refrigerant circulation system according to claim 12, further comprising a regulated expansion valve for regulating a fluid flow through the cooling body.

14. The refrigerant circulation system according to claim 13, wherein the regulated expansion valve is configured to regulate the fluid flow as a function of a temperature of the fluid after flowing through the cooling body.

15. The refrigerant circulation system according to claim 13, wherein the fluid flow is a refrigerant flow.

16. The refrigerant circulation system according to claim 12, wherein the cooling body is provided directly upstream of the compressor.

17. The refrigerant circulation system according to claim 12, further comprising an evaporator.

18. The refrigerant circulation system according to claim 12, further comprising a single evaporator.

19. A device for cooling a heat source of a motor vehicle, the device comprising:
- a cooling plate having at least two feed flow passages and at least two return flow passages, the at least two feed flow passages and the at least two return flow passages being arranged adjacent to each other in an alternating manner within the cooling plate,
- wherein the cooling plate has an inlet opening, which is connectable to the at least two feed flow passages,
- wherein the cooling plate has at least two outlet openings, each respective outlet opening being connected with only one respective return flow passage,
- wherein the at least two feed flow passages are each divided into a first partial passage and at least one second partial passage and the at least two return flow passages are each divided into a first partial return flow passage and a second partial return flow passage, and wherein the first partial passage of the feed flow passage is arranged directly adjacent to the second partial return flow passage corresponding to the second partial passage of the feed flow passage, and
- wherein the second partial passage of the feed flow passage is arranged directly adjacent to the first partial return flow passage corresponding to the first partial passage of the feed flow passage.

* * * * *